Sept. 24, 1957 A. C. KORTE 2,807,395
ELECTRIC FUEL PUMP MOUNTING
Filed May 24, 1954

INVENTOR.
ALFRED C. KORTE
BY George R. Ericson
ATTORNEY

United States Patent Office 2,807,395
Patented Sept. 24, 1957

2,807,395

ELECTRIC FUEL PUMP MOUNTING

Alfred C. Korte, St. Louis, Mo., assignor, by mesne assignments, to ACF Industries, Incorporated, New York, N. Y., a corporation of New Jersey Application May 24, 1954, Serial No. 431,744

9 Claims. (Cl. 222—333)

This invention relates to electric motor driven fuel pumps adapted for operation submerged in a fuel tank, and, more specifically, to an improved form of vibration-absorbing mounting for the pump.

According to the present invention, the electric fuel pump is supported from the tank top by a hanger member attached to a tank access hole cover. A vibration dampening mounting connects the hanger with the electric fuel pump and provides at the same time a tubular extension thereof for conveying the fuel under pressure from the electric fuel pump to a suitable fitting in the tank access hole cover. The hanger can readily be independently designed to position the pump in tanks of varying depth, so that no alteration is necessary in the pump structure because of tank dimensions. The cover plate for the tank access hole, and the hanger, contain the electrical connections from the power source to operate the electric motor pump.

Other novel features and advantages of this invention will become apparent as the description proceeds.

Figure 1:
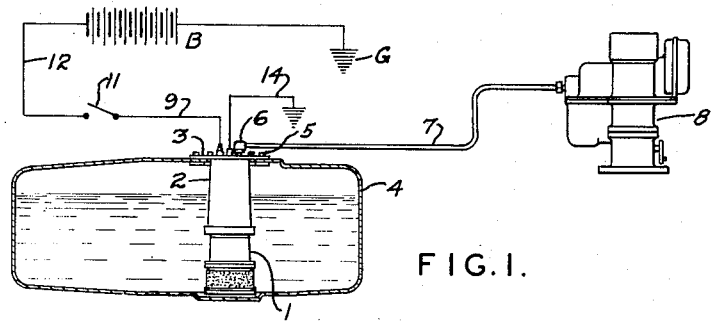
Fig. 1 is an environmental view of a fuel pump mounted within a fuel tank, together with the electrical and fluid line connections.

In Fig. 1 the electric fuel pump 1 is shown supported by a tubular hanger 2 depending from a tank access hole cover 3 suitably secured over an opening in the tank 4 by means of the cap screws 5. The cover 3 is provided with a fitting 6 to which is connected a fuel line 7 extending to the carburetor 8 for the engine of the motor vehicle. The electric conductor 9 extends from a switch 11 through a rubber ferrule 10 and is suitably connected with the electric motor in the fuel pump 1. The switch 11 may be the ignition switch of the motor vehicle which, when closed, will connect the lead 9 with a source of power 12 extending from a battery B. The battery B is suitably grounded at G.

Figure 2:
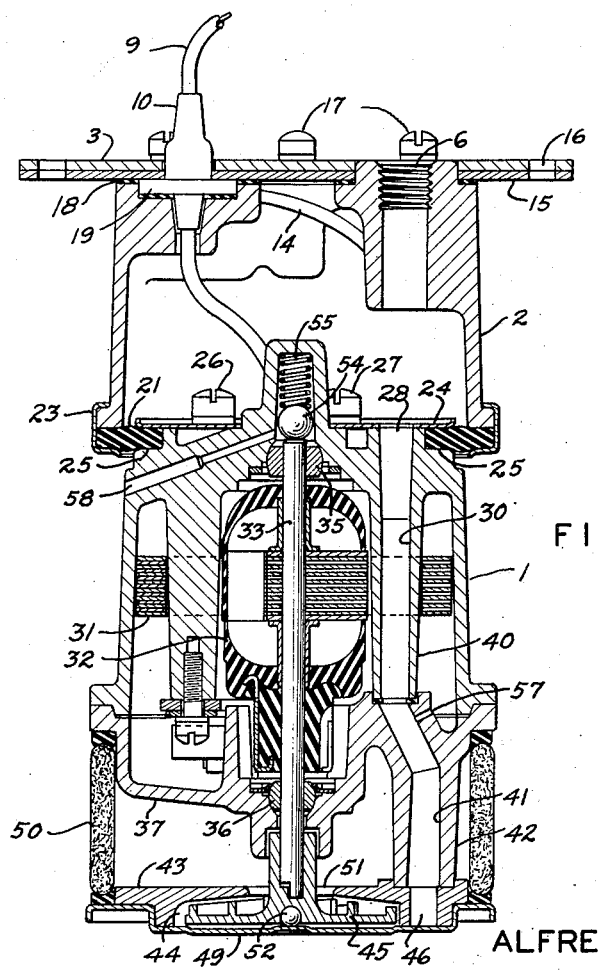
Fig. 2 is an enlarged view of the fuel pump and its mounting in cross-section.

Turning now to Fig. 2, the metal access hole cover plate 3 is insulated from the tank by a fibre plate 15. Registering holes 16 in the plate and the cover receive the screws 5. Tubular hanger 2 is detachably secured to the cover 3 by a series of cap screws 17 and, if desired, rubber sealing gaskets 18 may be disposed between the plate 15 and the upper surface of the tubular hanger 2. The lead 9 extends through the ferrule 10, which has an enlarged flange 19 tightly clamped between the plate 15 and the tubular hanger 2.

A rubber ring 21 is clamped to the lower open end of the hanger 2 by means of a sealing band 23, which may be spun or otherwise suitably deformed to compress the outer edge of the rubber ring 21 against the end of the hanger 2. The upper end of the motor housing 1 is provided with a reduced section 25 disposed against the inner edge of the rubber ring 21. Plate 24 overlies the end of the motor casing 1 and the inner edge of the rubber ring 21 and tightly seals the rubber ring 21 within the recessed portion 25 of the motor casing. Plate 24 is suitably secured in position by cap screws 26 and 27 and is apertured at 28 in alignment with a fluid discharge passage 30 extending through the motor casing 1. Lead 9 extends into the motor casing through a rubber grommet (not shown) held by plate 24. The electric pump shown is otherwise substantially identical with that disclosed in my co-pending joint application with Szwargulski, Jeep and Larson, Serial No. 431,743, filed May 24, 1954.

Within the motor casing is a field core 31 which surrounds the armature 32 on the rotatable shaft 33. Spherical, self-aligning bearing 35 receives the upper end of the armature shaft. The lower end of the shaft is journaled in a similar bearing 36 within a recess in the motor casing cover 37. Extending through the motor casing 1 is an elongated boss 40 containing fuel passage 30 which connects with a fuel passage 41 within a boss 42 extending from the cover 37. Secured to the cover 37 is a pump body 43 having a volute 44 containing the impeller 45. A fuel passage 46 within the pump body connects the volute with the fluid passages 41, 30. The pump volute and passage are sealed by a suitable cover plate 49 attached to the pump body. A cylindrical filter 50 is disposed between the cover plate and the flange of the cover 37 for screening impurities from the inlet to the pump chamber 51.

Motor shaft 33 is connected in driving relation with the impeller 45, which is suitably journaled on a ball thrust bearing 52 mounted in a socket in the impeller 45. The opposite end of the shaft 33 has a ball thrust bearing 54 and a preloaded spring 55 for eliminating any endplay in the shaft 33.

Lubrication and cooling of the pump are obtained by a circulation system under pressure. For this purpose, passage 41 has a metered bleed opening 57 into the motor casing 1. An outlet opening is provided from the casing by way of the opening 58 adjacent the ball thrust bearing 54. Other openings may be provided for drainage and flow control, if desired, as discussed in my co-pending application with Szwargulski, Jeep and Larson, above referred to.

An electrical ground connection 14 for the motor is provided to connect the cover 3 with one of the cap screws 26 or 27.

In operation, when the switch 11 is closed, the motor of the pump will be connected from the battery B by way of leads 9 and 12 and with the ground by way of lead 14. Operation of the motor will generate pressure in the volute 44 and the fuel will flow through the passages 46, 41, 30, which are located within the pump and motor casing, to the chamber within the tubular hanger 2, and then by way of a connection 6 to the fuel line 7 and the carburetor 8. Resilient mounting 21 is sealed at its opposite edges to the pump and hanger to prevent any leakage at this point, so that full pressure will be delivered to the outlet connection 6.

The outlet connection 6 is formed in a boss in the hanger 2, which may extend an appreciable distance within so as to form a surrounding vapor or air pocket. This vapor pocket is a pressure dome which will absorb variations in output pressure of the pump due to rapid changes in speed or surging, so as to provide uniform output pressure at the connection 6.

Fuel pressure in the passage 41 will force some of the fuel through the bleed opening 57, and thence to the self-aligning bearings 35 and 36 to lubricate and cool the motor and the bearings. Fuel will escape by way of the metered outlet 58.

Any vibration of the motor due to its operation is insulated from the fuel tank by the rubber ring 21, which provides a suspension in shear between the motor casing 1 and the hanger 2.

A structure has been described which will fulfill all of the objects of the present invention, but it is contemplated that other modifications will occur to those skilled in the art which are within the scope of the appended claims.

I claim:

1. An electric motor driven tank mounted fuel pump adapted for submerged operation in a fuel tank comprising, in combination, an electric driven pump and a hanger for said pump including an access hole cover plate adapted to close an access opening in said tank, said hanger consisting of a tubular support on said cover plate adapted to extend into said tank, a resilient ring spaced inwardly of the cover plate connected adajacent one of its peripheries adjacent the lower end of said support and adjacent the other of its peripheries to said pump for insulating the support from pump vibration, the pump being located below said support, a fluid discharge for said pump opening into said support, and means forming an air dome within the upper end of said support providing a resilient cushion between said support and said pump during pump operation.

2. A fuel pump structure according to claim 1, wherein said pump comprises a body having a fuel discharge passage leading into said support, and said support is provided with a fuel conduit extending upwardly from within said support through said cover for connection with a fuel line, said fuel conduit having its inlet end spaced downwardly from said cover to prevent the escape of vapors from said air dome.

3. A fuel pump structure according to claim 1, wherein said pump comprises a body having a seat, and said resilient ring is clamped against said seat.

4. In a fuel system, a fuel tank having an access opening, a cover closing said opening, a tubular support in sealing engagement with said cover and extending downwardly into said tank, a resilient ring spaced inwardly of said cover and connected at one of its peripheries to the lower end of said support, a motor-pump unit located below said support and having a casing connected to the other periphery of said ring, said motor-pump unit having a fuel discharge leading therefrom into said support, means forming an air dome within said support providing a resilient cushion during pump operation, and outlet means to discharge fuel from said support outwardly through said cover.

5. In a fuel system having a fuel tank formed with an access opening, a cover adapted to close said opening, a tubular support depending from said cover, a motor-pump unit having a casing below said support and formed with an annular seat, a resilient ring spaced from said cover and having its inner marginal portion secured to said seat and its outer marginal portion secured to the lower end of said support, said motor-pump unit having a discharge outlet leading into said tubular support, said cover and support defining an air dome, and outlet means to direct fuel from the lower end of said support outwardly through said cover.

6. In a fuel pump structure adapted to be mounted within a fuel tank, a tank cover, a hanger secured in fixed position on said cover to extend downwardly into said tank, an electric driven pump having a body, and means resiliently interconnecting said pump body and hanger to yieldably resist relative movements therebetween, said hanger having a fuel chamber, and said pump body having a fuel discharge passage to direct fuel into said chamber.

7. In a fuel pump structure adapted to be mounted within a a fuel tank, a tank cover, a hanger secured in fixed position on said cover to extend downwardly into said tank, an electric driven pump having a body, and means resiliently interconnecting said pump body and hanger to yieldably resist relative movements therebetween, said hanger having a fuel chamber, and said pump body having a fuel discharge passage to direct fuel into said chamber, said means including a resilient ring forming a fluid sealing connection between said hanger and said pump body.

8. In a fuel pump structure adapted to be mounted within a fuel tank, a tank cover, a hanger secured in fixed position on said cover to extend downwardly into said tank, an electric driven pump having a body, and means resiliently interconnecting said pump body and hanger to yieldably resist relative movements therebetween, said hanger having a fuel chamber, and said pump body having a fuel discharge passage to direct fuel into said chamber, said means including a resilient ring forming a fluid sealing connection between said hanger and said pump body, the inner marginal portion of said ring being clamped to said pump body and the outer marginal portion of the ring being clamped to said hanger whereby said ring is stressed in shear.

9. In a fuel pump structure adapted to be mounted within a fuel tank, a tank cover, a hanger secured in fixed position on said cover to extend downwardly into said tank, an electric driven pump having a body, and means resiliently interconnecting said pump body and hanger to yieldably resist relative movements therebetween, said hanger having a fuel chamber, and said pump body having a fuel discharge passage to direct fuel into said chamber, said means including a resilient ring forming a fluid sealing connection between said hanger and said body, said hanger having an outlet conduit provided with an inlet end spaced downwardly from said cover and an outlet end extending upwardly through the cover whereby pressurized vapors are trapped within the fuel chamber adjacent the cover.

References Cited in the file of this patent

UNITED STATES PATENTS

| | | |
|---|---|---|
| 2,139,370 | Lauer et al. | Dec. 6, 1938 |
| 2,329,728 | Samiran | Sept. 21, 1943 |
| 2,370,590 | Taylor | Feb. 27, 1945 |